Nov. 21, 1950　　　　　　H. J. GERBER　　　　　　2,530,955
INSTRUMENT FOR MEASURING, INTERPOLATING AND THE LIKE
Filed May 25, 1948　　　　　　　　　　　　　　　3 Sheets-Sheet 1
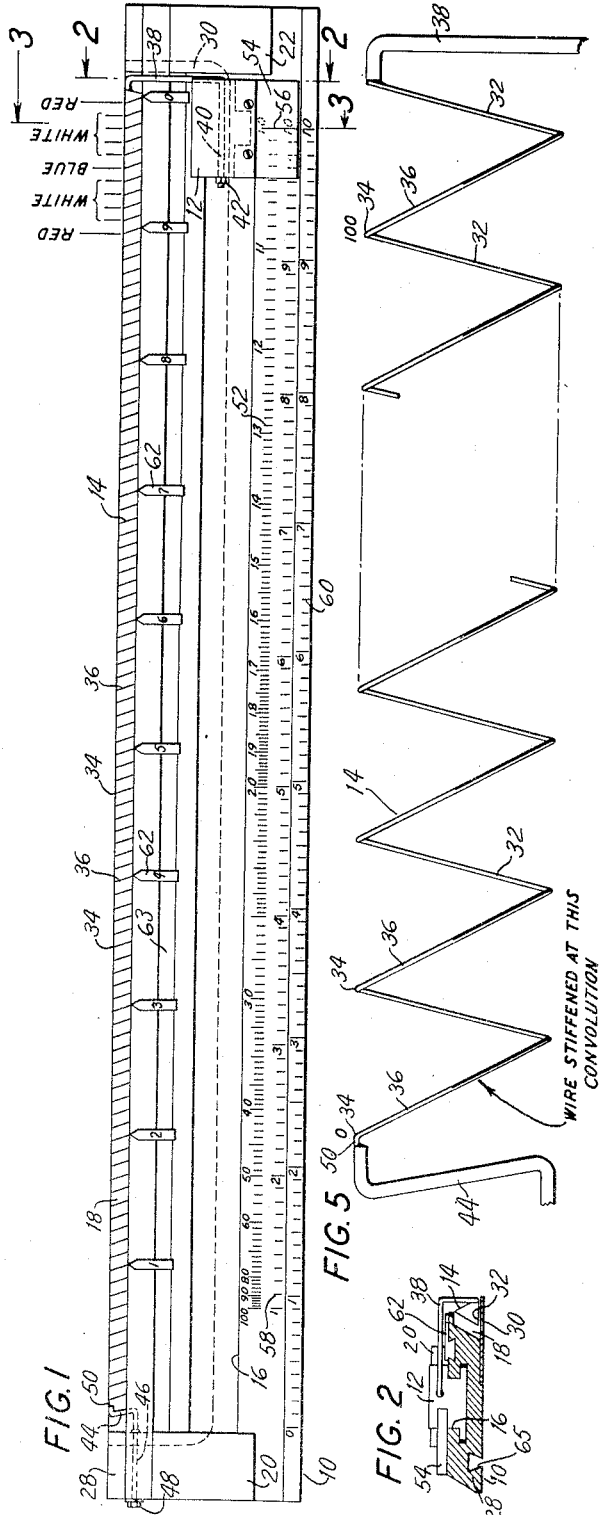
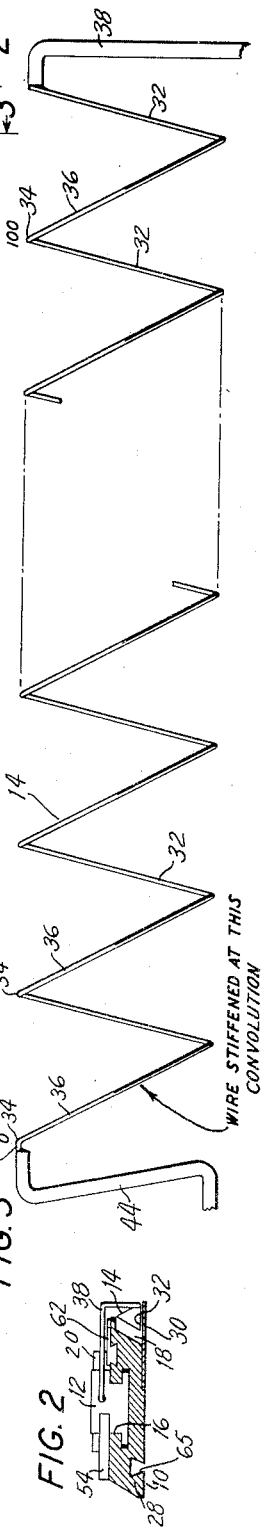
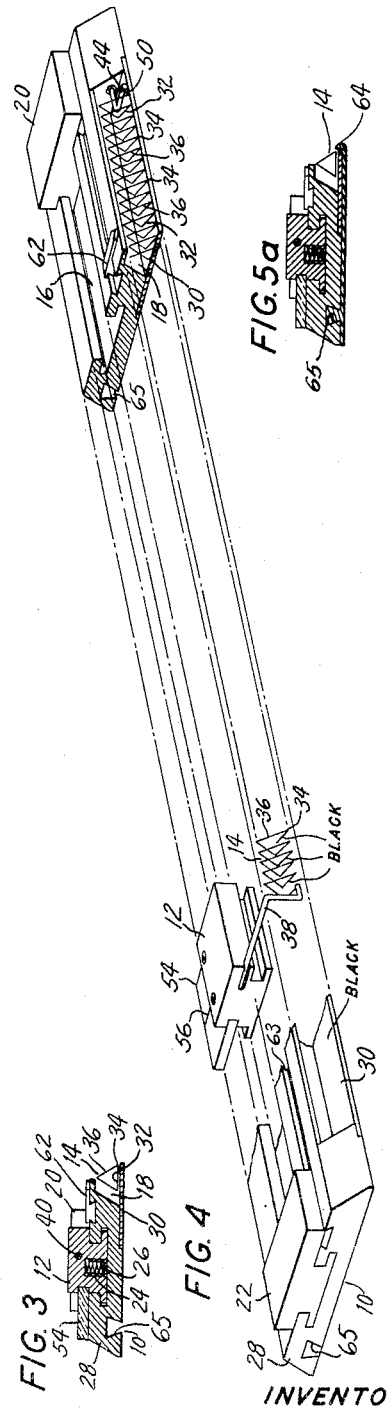
INVENTOR
HEINZ JOSEPH GERBER
BY S. Jay Teller
ATTORNEY

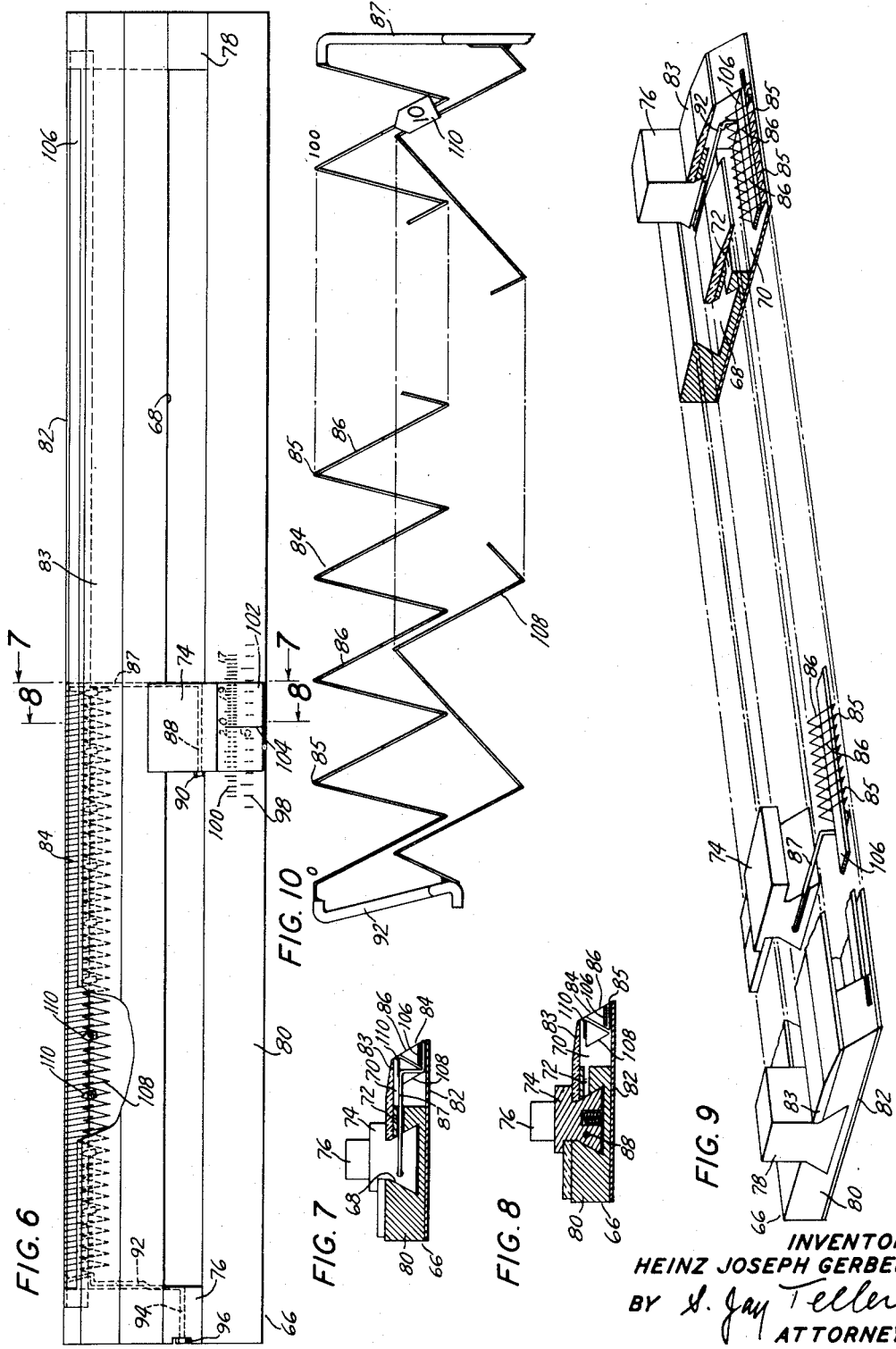

Nov. 21, 1950 H. J. GERBER 2,530,955
INSTRUMENT FOR MEASURING, INTERPOLATING AND THE LIKE
Filed May 25, 1948 3 Sheets-Sheet 3
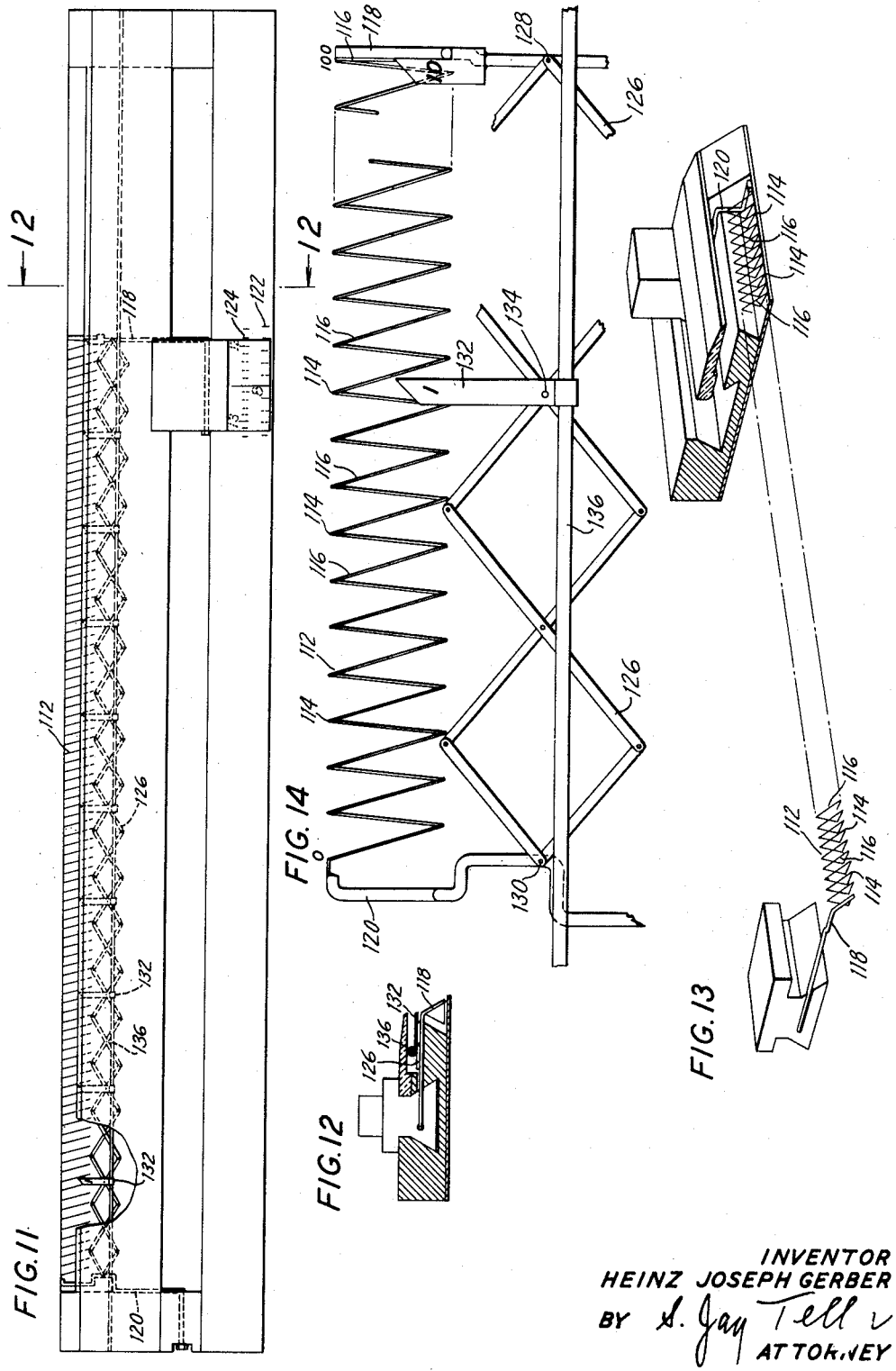
INVENTOR
HEINZ JOSEPH GERBER
BY S. Jay Tell
ATTORNEY Patented Nov. 21, 1950

2,530,955

UNITED STATES PATENT OFFICE 2,530,955

INSTRUMENT FOR MEASURING, INTERPOLATING, AND THE LIKE

Heinz Joseph Gerber, Hartford, Conn., assignor to The Gerber Scientific Instrument Company, Hartford, Conn., a corporation of Connecticut Application May 25, 1948, Serial No. 29,114

44 Claims. (Cl. 235—61)

The invention relates particularly to instruments of the type disclosed in my copending application for Instrument for Measuring, Interpolating and the like, Serial No. 671,019, filed May 20, 1946. The present application is a continuation-in-part of my copending application for Apparatus for Making Scales for Measuring Instruments, Serial No. 671,018 which has been abandoned.

An instrument of the type to which the invention relates is adapted for use by draftsman, engineers, scientists and others for a variety of purposes. The instrument has an extensible spring, portions of the convolutions of which constitute graduations adapted for use in measuring, interpolating and the like. The instrument may be used as an adjustable draftman's scale for making drawings on any reduced or increased scale within the range of the instrment, or for subdividing established distances or dimensions, or for interpolating intermediate points in plotting charts or graphs, or for a variety of other purposes including multiplying and dividing.

The general object of the present invention is to provide an instrument such as that set forth in my aforesaid prior application, Serial No. 671,019, but having various improvements in detail as will hereinafter be fully set forth.

A more specific object of the invention is to provide a spring having a formation and shape particularly adapting it for its intended purpose.

Another specific object of the invention is to provide an improved general arrangement of parts, more particularly as to the relationship of the slide and the spring with respect to the base.

Still another specific object of the invention is to provide an arrangement of parts which provides a straight edge at the front for drafting purposes and which at the same time enables the extensible spring to be readily used as a graduated scale associated with the said straight edge.

A still further specific object of the invention is to provide a particular form of spring mounting which gives increased accuracy and other advantages.

Another specific object of the invention is to provide means separate from the spring and serving with the spring at various lengths to distinguish certain selected graduations from other graduations.

Still other specific objects of the invention will be apparent from the drawings and from the following specification and claims.

In the drawings I have shown several embodiments of the invention, but it will be understood tha various changes may be made from the constructions illustrated and that the drawings are not to be construed as defining or limiting the scope of the invention, the claims forming a part of this investigation being relied upon for that purpose.

Of the drawings:

Fig. 1 is a plan view of an instrument embodying the invention.

Fig. 2 is a transverse sectional view taken along the line 2—2 of Fig. 1.

Fg. 3 is a transverse sectional view taken along the line 3—3 of Fig. 1.

Fig. 4 is a fragmentary perspective view taken from the right front and showing various details of construction.

Fig. 5 is an enlarged schematic view of the extensible spring and the immediate connecting means therefor.

Fig. 5ᵃ is a view similar to Fig. 3 but showing an alternative construction.

Fig. 6 is a view similar to Fig. 1 but showing an alternative embodiment of the invention.

Fig. 7 is a transverse sectional view taken along the line 7—7 of Fig. 6.

Fig. 8 is a transverse sectional view taken along the line 8—8 of Fig. 6.

Fig. 9 is a fragmentary perspective view taken from the right front of the instrument illustrated in Fig. 6 and showing various details of construction.

Fig. 10 is an enlarged schematic view of the extensible springs and the immediate connecting means therefor as shown in Fig. 6.

Fig. 11 is a plan view similar to Fig. 1 and showing still another alternative embodiment of the invention.

Fig. 12 is a transverse sectional view taken along the line 12—12 of Fig. 11.

Fig. 13 is a fragmentary perspective view taken from the right front and showing various details of construction of the alternative instrument shown in Fig. 11.

Fig. 14 is an enlarged schematic view of the extensible spring and of the lazy tong links as shown in Fig. 11.

*Instrument shown in Figs. 1 to 5*

The instrument shown in Figs. 1 to 5 comprises three main parts which are a base 10, a member or slide 12 movable along the base, and an extensible spring 14 connected at one end with the base end and at the other end with the member or slide so that its total length can be varied by varying the position of the member or slide with respect to the base. Within the scope of the invention these several parts can be varied substantially as to details.

The base 10 is preferably elongated and has an open-top longitudinal groove 16 and an open-front longitudinal groove 18. The open-top groove 16 is shown as being T-shaped and it constitutes a longitudinal guideway for the slide 12, the lower portion of which is shaped to fit the groove. As shown, blocks 20 and 22 are located in permanent positions at the ends of the groove 16.

As shown in Fig. 3, the slide 12 is preferably provided with frictional means tending to hold it in fixed position in the groove. The slide is provided with a hole extending upward from the bottom and a tubular member 24 with a closed bottom is located in this hole. A spring 26 is located in the hole and in the tubular member 24, the latter being pressed by the spring into frictional engagement with the bottom of the groove 16 in the base.

While the invention is not so limited, I have shown the base as comprising a main body 28, which may be formed of metal and suitably machined or formed by molding or otherwise from a suitable plastic or other material, and as also comprising a bottom plate 30 secured by cementing or otherwise to the main body 28. As shown, the bottom plate 30 is set into a correspondingly shaped recess in the bottom of the base body 28. When a separate plate 30 is provided this plate constitutes the bottom wall of the open-front groove 18. The groove 18 is otherwise formed within the main body 28 of the base and is preferably closed at its ends by integral portions of the said main body. The front portion of the plate 30 constitutes a thin portion of the base extending along the front and positioned immediately adjacent the bottom plate of the base. The front edge of the plate 30 is straight and constitutes a straight longitudinal front edge which is adapted to be used for drafting purposes.

The spring 14 is positioned within the open-front groove 18. The left end of the spring, as viewed in Fig. 1, is connected with the base and the right end of the spring, as viewed in the same figure, is connected with the slide. The spring 14 is preferably a coil spring having its convolutions uniformly spaced longitudinally, the spacings between all of the convolutions being uniformly varied when the length of the spring is varied by movement of the slide. While there may be variations in the details of the spring, I prefer to provide a spring having its convolutions generally triangular in shape. Preferably each of the convolutions is shaped to form an equilateral triangle, as clearly shown in Figs. 2 and 3, but an equilateral triangle is not essential. The spring may be further varied from the exact shape shown by making some or all of the sides of the convolutions somewhat curved. The spring is preferably so located that straight or substantially straight portions 32 of the convolutions are horizontal and are in close proximity with the top of the plate 30. The convolutions of the spring are sharply bent and the spring therefore has longitudinally aligned sharp corner portions 34, 34 which are at the bottom thereof and at the front thereof. These corner portions constitute graduations particularly in conjunction with the adjacent inclined convolution portions 36, 36.

It will be seen that the upper front portions 36, 36 of the convolutions are inclined upward and rearward from the said corner portions 34, 34. This upward and rearward inclination facilitates observation of the graduations, particularly when viewed from the top. The spring is so located that the graduations are immediately adjacent the straight front edge of the thin portion of the base, and the spring is preferably so located that the said graduations are spaced rearward to a small extent from the said straight edge. This small rearward spacing permits the said straight edge to be used in the ordinary manner for the guidance of a pencil or pen in drafting, but the graduations are sufficiently close to the said straight edge to permit the convenient use of the graduations for transferring dimensions to the drawing and for other purposes.

Preferably the front edge of the upper wall of the open-front groove 18 in the base is spaced rearward from the front edge of the lower wall of the said groove, which lower wall is the said thin portion 30 of the base. The said rearward spacing is such that the relatively sharp corners of the spring convolutions at the top thereof are substantially in vertical register with the front edge of the said upper wall of the groove. Thus the front portions 34 and 36 of the spring convolutions are readily visible from the top, but the rear portions of the spring convolutions are concealed.

The number of spring convolutions and the number of graduations may be widely varied, but I have shown a spring having 100 convolutions which are utilized and having 100 graduations, the spring having a minimum effective length of 1″ and a maximum effective length of 10″. The convolutions are spaced to provide 100 graduations per inch at a length of 1″ and 10 graduations per inch at a length of 10″. In describing the convolutions and the graduations as "spaced," reference is had to the spacing between the center lines of the convolutions and of the graduations.

For connecting one end of the spring 14 with the slide 12 a transverse arm 38 is provided, this arm being connected with the slide and extending transversely toward the front above the base. It will be observed that the arm 38 is at the end of the slide which is remote from the fixed end of the spring. Thus the slide does not extend to any substantial extent beyond the movable end of the spring and the overall length of the instrument is kept at a minimum. The arm 38 is formed of wire and it has a right-angled bend therein so that a longitudinal portion 40 thereof extends through a longitudinal hole in the slide as shown by dotted lines in Fig. 1. A nut 42 engages the left end of the arm portion 40 as shown in Fig. 1 to hold the arm in place. The end of the slide has a groove into which the transverse portion of the arm 38 fits, this groove preventing the arm from turning about the axis of its longitudinal portion 40.

For connecting the other end of the spring 14 with the base a transverse arm 44 is provided, this arm being connected with the left end portion of the base. The arm 44 is formed of wire and it has a right-angled bend therein so that a longitudinal portion 46 thereof extends through a longitudinal hole in the base as shown by dotted lines in Fig. 1. An enlargement on the portion 46 limits its movement toward the left. A nut 48 engages the left end of the arm portion 46 as shown in Fig. 1 to hold the arm in place.

The connection of the spring with the transverse arms 38 and 44 may be varied, but the said connection may desirably be as shown in Fig. 5. The bottom of the front portion 36 of the convolution at the extreme left is closely adjacent the arm 44 and a very short portion 50 of the wire of the spring preferably extends longitudinally toward the arm and is connected therewith by soldering or otherwise. Thus the spring is so connected that the front of the graduation 34 at the extreme left is held in fixed position. At the right the spring preferably extends beyond the "100" graduation and preferably has a complete additional convolution. The forward end of the portion 32 of the last said convolution is connected by soldering or otherwise with a downward extending portion of the arm 38.

The effective portions 34 of the graduations are at the fronts and bottoms of the portions 36 of the spring convolutions, but these portions 36 assume different angles for different amounts of spring extension. With the ends of the spring connected as described all of the portions 36 move angularly in unison. Inasmuch as the bottom of the portion 36 at the extreme left is connected substantially directly to the arm 44, it is free to assume an angular position as shown in Fig. 5. Inasmuch as the portion 36 at the extreme right is a part of the aforesaid additional convolution, the said portion is free to move angularly as also shown in Fig. 5. The intermediate portions 36 also move angularly and to the same extent. If either of the portions 36 at the extreme ends were rigidly connected with its adjacent arm, the portion so connected would not be free to flex as stated and would be to some extent out of parallelism with the other portions 36. The variations from parallelism would be small with the spring at minimum length and would increase with increases in length.

Without suitable compensation or correction, there would be a slight error in the spacing between the fixedly supported "0" graduation of the spring and the next adjacent graduation thereof, such error being due to the rigid attachment of the spring to the arm 44 immediately adjacent the said "0" graduation. The said spacing would be slightly greater than the spacing between other adjacent graduations. The error is small and may be ignored for some instruments, but when a very high degree of precision is necessary a provision is made for compensating for the error. Compensation for the error may be provided by slightly stiffening the left end of the spring, such stiffening including all or a substantial portion of the first convolution. This stiffening may be effected by plating the said end portion of the spring with a suitable metal to increase the thickness of the wire at the said end. The thickness of plating is very small and is indicated by a notation on Fig. 5. Alternatively the aforesaid error or variation may be eliminated by changing the soldering at the short portion 50 of the wire so that it extends substantially to the "0" graduation, or if necessary slightly beyond it along the adjacent front portion 36 of the spring.

In order to conveniently determine or show the relationship between the position of the slide and the number of spring graduations per unit of length, a longitudinally graduated reciprocal scale 52 is provided on the front of the base. The slide 12 carries a transparent plate 54 marked with a transverse line 56 thereon which constitutes an indicator for registering with various graduations on the scale. For convenience of illustration the line 56 is shown in Fig. 4 as being at the top of the plate 54, but for greater accuracy the said line should be at the bottom of the said plate immediately adjacent the surface of the base which carries the scale 52. As shown in Fig. 1, the line 56 is at the graduation "10" on the scale, thus indicating that the slide is set to provide ten spring graduations per inch. All of the other graduations of the scale indicate the respective numbers of spring graduations per inch when the indicator 56 is placed at the said scale graduations.

The before-described connection of the left or zero graduation in a fixed position with respect to the base is essential for accurate indication of the said numbers by the indicator 56. If the said left or zero connection were movable with each variation of spring length, an error would occur in each reading of the indicator.

The spring 14 is shown as connected at its right end at a point separated from the graduation at the said end. When the spring is so connected it is highly important that compensation be provided in spacings between the graduations of the longitudinal scale which is used for determining the variations in spring length.

Referring particularly to the spring connection as shown in Fig. 5, the graduation markings of the scale 52 must be such as to provide proper compensation for the additional spring convolution at the right. With the slide set at "10," as shown in Fig. 1, the distance between the two end graduations "0" and "100" of the spring must be exactly 10". However, the corresponding scale graduation marked "10" must be at a distance from a theoretical reference point (not shown) which is equal to 10" plus the spacing between spring graduations which is .1", the total distance being 10.1". Similar variations in the scale must be made throughout its length. For instance, the scale graduation marked "20" must be at a distance from the said reference point which is equal to 5" plus the spacing between spring graduations which is .05", the total distance being 5.05". Similarly, the scale graduation marked "100" must be at a distance from the said reference point which is equal to 1" plus the spacing between spring graduations which is .01", the total distance being 1.01". From the foregoing it will be apparent that the total distance between the end graduations of the scale 52, instead of being exactly 9", must be 10.1" minus 1.01" which is 9.09".

The base is preferably also provided with a second longitudinal scale 58 which is graduated to read directly in inches. The scale 58 indicates in inches the total effective length of the spring between the graduations at the ends thereof. When the scale 58 is provided, the spacings between the graduations thereof must be varied as explained in connection with the scale 52.

The rear edge of the body 28 of the base is preferably beveled and a third scale 60 may be placed on the beveled edge. This facilitates use of the instrument for ordinary drafting purposes.

The several convolutions of the spring 14, particularly the front corner portions 34 thereof in association with the adjacent inclined portions 36 thereof, serve in and of themselves as graduations indicating linear spacing, but I prefer to provide markings on at least some of the front portions and graduations so that they can be more readily distinguished from each other in the use of the instrument. As indicated in Fig. 1, some of the front portions are suitably colored to distinguish certain graduations from other graduations. One kind of marking may be placed on all front portions corresponding to multiples of a predetermined number and a different kind of marking may be placed on intermediate front portions corresponding to fractions of the said predetermined number. For example, each tenth front portion may be colored red, the front portions for the graduations "0" and "100" both being red, and each intermediate fifth front portion may be colored blue. As the result of the said red and blue markings the graduations are differentially marked.

The remaining front portions may be without any color different from that of the main body of the spring, but preferably for a reason to be presently pointed out the said remaining front portions are given a color such as white which contrasts with the said red and blue markings and also contrasts with the color of the main body of the spring. All of the described colored markings preferably extend throughout substantial portions of the said front portions 36 of the spring, and the coloring extends along the said portions to the graduations 34. Thus the colored markings extend transversely of the length of the spring and terminate at the graduations and enable the user to readily observe and identify the graduations. This avoids any possible optical illusion and concentrates attention on the graduations.

It may sometimes be preferable to provide markings other than decimal markings. For instance, one color of marking may be provided for each eighth graduation, another color may be provided for each intermediate fourth graduation and another color may be provided for each intermediate second graduation. With such markings the number of convolutions per inch with the spring at minimum length might advantageously be 64 or 128.

In looking downward on the instrument with the spring extended the bottom portions 32 of the spring convolutions would be visible in the absence of any provision to the contrary. These bottom portions would tend to distract attention from the graduations and would cause difficulty in observing the graduations. In order to avoid this condition, the said bottom portions 32 of the convolutions are preferably colored to match the color of the base or at least that of the bottom portion 39 thereof. For instance, when the bottom portion of the base is black the said bottom portions 32 of the spring convolutions are also black, thus becoming practically invisible. The color for the bottom portion of the base and for the said bottom portions 32 of the convolutions is preferably such as to contrast with any of the colored markings on the front portions of the spring.

While it is only the bottom portions 32 which are required to match the color of the base, it is ordinarily preferable and more convenient to initially give the entire spring a surface finish, by any suitable method, which provides a color such as black that matches the color of the bottom of the base. With the entire spring initially colored as described, it would be difficult to observe any of the front portions 36 of the spring unless such front portions were separately colored. It is for this reason that all of the said front portions of the spring are separately colored as before stated, each tenth front portion being red, each intervening fifth front portion being blue and each remaining front portion being white. Thus all of the front portions are readily observable, inasmuch as they contrast with the color of the other parts of the spring and with the color of the bottom of the base. The colored markings on the front portions of the spring lead the eye of the user to the graduations at the transversely narrow or sharply bent portions.

While somewhat less desirable, the positions of the coloring on the spring convolutions may be reversed. The red, blue and white markings as described may be placed on the horizontal bottoms of the convolutions and the inclined front portions 36 of the convolutions may be colored black to match the color of the bottom of the base.

As already stated, the slide 12 is frictionally held by the spring-pressed tubular member 24 in any position to which it may be moved. The frictional resistance offered by the said member is such as to prevent movement of the slide by the tension of the spring 14. In setting the instrument to provide a graduated scale of any desired length it is merely necessary for the user to move the slide to the desired position as determined by the scale 52.

While not always essential, it is desirable to provide a plurality of movable indicators or pointers 62, 62 on the base. As shown, the base is provided with a longitudinal dovetail groove 63 and the pointers 62, 62 are shaped to fit the groove and to be manually moved longitudinally along the base, being held in place by friction. The pointers 62, 62 may be marked with numbers from 1 to 10. The said pointers constitute means separate from the markings on the graduations for distinguishing certain selected graduations from other graduations.

The pointers 62, 62 are particularly useful when the instrument is to be used for a considerable period of time without changing the setting thereof. The pointers 62, 62 can be adjusted to designate selected convolutions or graduations on the spring 14 as for instance every tenth convolution or graduation. This permits the user to more readily find each tenth convolution or graduation even though the said convolutions or graduations are already distinguished by colored markings.

The instrument may be used in the same manner as an ordinary draftsman's scale but it differs from such a scale in that the graduations thereof may have any desired spacings within a prescribed range. With this instrument it is not necessary for the draftsman to have a number of different drafting scales which have to be substituted for one another. In lieu of using a variety of scales the draftsman can use but a single scale changing the settings thereof from time to time as may be necessary for the particular drafting work to be done. For instance, if a drawing is to be made half size the indicator 56 can be set at 20 on the scale 52, thus providing 20 divisions per inch or 10 divisions per half inch. If a drawing is to be made one-quarter size the indicator 56 can be set at 40 on the scale 52, thus providing 40 divisions per inch or 10 divisions per quarter inch.

If it is desired to reproduce a drawing on a reduced or increased scale having an unusual ratio to the original, it is unnecessary to use proportional dividers as is now customary. It is merely necessary to set the instrument at the desired ratio thus providing a scale having the required ratio of reduction or increase.

The instrument can also be advantageously used for subdividing any given distance on a drawing or graph, between two points or between two lines, into any desired number of subdivisions. For instance if two points on a drawing are spaced apart by some uneven distance, perhaps approximately five inches, this distance can be divided into forty-five parts by placing the graduation at the extreme left at one point and by moving the slide to adjust the spring so that the graduation representing 45, as indicated by the colored marking, is on the other point.

The instrument can be used for multiplying or dividing. When the instrument is to be so used, an additionally manually movable marker or pointer 64 is preferably provided, as shown in Fig. 5a. This additional pointer may be supported and guided in any of a variety of ways, but it is shown as being guided in a longitudinal dovetail groove 65 in the bottom of the base. The pointer 64 has an upturned pointed front end which can be used to designate or register with any of the graduations at the lower front of the spring 14.

For multiplying the steps are as follows:

Set the indicator 56 at "10" on the scale 52.
Set the pointer 64 at the multiplicand on the spring 14.
Set the indicator 56 at the multiplier on the scale 52.
Read the product on the spring 14 by means of the pointer 64.

For instance, if 24 is to be multiplied by 3.75, the procedure is:

Set the indicator 56 at "10" on the scale 52.
Set the pointer 64 at "24" on the spring 14.
Set the indicator 56 at "3.75" (that is, at "37.5") on the scale 52.
Read the product, which is 90, on the spring 14 by means of the pointer 64.

As has been stated, the scale 52 serves in conjunction with the indicator 56 to show the number of graduations per inch in the spring 14 for any setting thereof. With the indicator at 10 there are 10 graduations per inch, and for different scale readings the number of graduations per inch is increased by the ratio between 10 and the particular scale reading. For instance, if the scale reading is 12 there are 12 graduations per inch, and the number of such graduations has therefore been multiplied by 1.2. If the scale reading is 37.5 there are 37.5 graduations per inch and the number of such graduations has been multiplied by 3.75.

With the spring 14 at full length and having 10 graduations per inch and with the pointer 64 set at any given graduation on the spring, the position of the pointer represents the number of inches and the number of graduations between it and the "0" graduation. If the pointer is at 24 it is 2.4" from the "0" graduation and there are 24 graduations between the "0" graduation and the pointer. When the indicator 56 is moved to a new position on the scale 52, the number of graduations per inch is correspondingly multiplied as above explained, and thus there is the same multiplication of the total number of graduations between the "0" graduation and the pointer 64. In the example given, there were initially 24 graduations between the "0" graduation and the pointer. When the number of graduations per inch is multiplied by 3.75, the total number of graduations between the "0" graduation and the pointer is also multiplied by 3.75. The result is that there are 90 graduations between the "0" graduation and the pointer. The pointer therefore registers with 90 on the spring 14, this being the product of the multiplication.

For dividing the steps are as follows:

Set the indicator 56 at the divisor on the scale 52.
Set the pointer 64 at the dividend on the spring 14.
Set the indicator 56 at "10" on the scale 52.
Read the quotient on the spring 14 by means of the pointer 64.

For instance, if 90 is to be divided by 3.75, the procedure is:

Set the indicator 56 at "3.75" (that is, at "37.5") on the scale 52.
Set the pointer 64 at "90" on the spring 14.
Set the indicator 56 at "10" on the scale 52.
Read the quotient, which is "24," on the spring 14 by means of the pointer 64.

For approximate results, without extreme accuracy, one of the pointers 62 may be used for multiplying or dividing instead of the special pointer 64. When one of the pointers 62 is so used, slight errors are introduced on account of the varying angles of the front portions 36 of the spring 14.

Many other uses of the instrument will be apparent to those skilled in the art without further detailed explanation.

*Instrument shown in Figs. 6 to 10*

The instrument shown in Figs. 6 to 10 is in many respects similar to that shown in Figs. 1 to 5, but differs as to various important features. The movable slide is shown at a position different from that of the slide 12 in Fig. 1.

The base 66 has an open-top longitudinal groove 68 and an open-front longitudinal groove 70, a longitudinal slot 72 being provided between the two grooves. The open-top groove 68 is preferably of dovetail shape and constitutes a longitudinal guideway for the slide 74, the lower portion of which is shaped to fit the groove. As shown, blocks 76 and 78 are located in permanent positions at the ends of the open-top groove 68, these blocks having upward extending portions which may serve as handles. As shown in Fig. 8, the slide 74 is preferably provided with frictional means similar to that already described.

I have shown the base as comprising a main body 80 and a bottom plate 82 secured by cementing or otherwise to the main body. As shown, the bottom plate extends over the entire bottom area of the base. Its functions are similar to those of the plate 30 as already described. The base may also comprise a separate upper front portion 83 which is cemented in place and which is formed of transparent material. The plate 82 constitutes the bottom wall of the open-front groove 70, the said body portion 83 constituting the top wall of the said groove. The groove 70 is preferably closed at its ends by integral portions of the main body of the base. The length of the slot 72 is preferably the same as that of the groove 70.

A spring 84 is provided which is or may be identical in form with the spring 14 already described. The spring 84 has front corner portions 85 and these front corner portions, together with the adjacent inclined portions 86 constitute the graduations. For connecting one end of the spring 84 with the slide 74 a transverse arm 87 is provided, this arm being connected with the slide and extending through the longitudinal slot 72. The arm 87 is formed of wire and it has a right-angled bend therein so that a longitudinal portion 88 thereof extends through a longitudinal hole in the slide as shown by dotted lines in Fig. 6. A nut 90 engages the left end of the arm portion 88 to hold the arm in place. The end of the slide has a groove into which the transverse portion of the arm 87 fits, this groove preventing the arm from turning about the axis of its longitudinal portion 88.

For connecting the other end of the spring 84 with the base a transverse arm 92 is provided, this arm being connected with the block 76 and extending through the longitudinal slot 72. The arm 92 is formed of wire and it has a right-angled bend therein so that a longitudinal portion 94 thereof extends through a longitudinal hole in the block 76 as shown by dotted lines in Fig. 6. A nut 96 engages the left end of the arm portion 94 as shown in Fig. 6 to hold the arm in place. The end of the block has a groove into which the transverse portion of the arm 92 fits, this groove preventing the arm from turning about the axis of its longitudinal portion 94.

The connection of the spring 84 with the transverse arms 87 and 92 may be as shown in Fig. 10, this being essentially the same as for the spring 14 as shown in Fig. 5.

Scales 98 and 100 are provided on the base which are similar respectively to the scales 52 and 60. Only fragments of the scales are shown. The slide 74 carries a transparent plate 102 marked with a transverse line 104 which constitutes an indicator for registering with various graduations on the scales.

The colored markings on the front portions of the spring 84 are or may be the same as those already described for the spring 14. The coloring on the bottoms of the spring convolutions may be omitted. In lieu of the said coloring on the bottoms of the convolutions a longitudinal bar 106 is provided which extends within the convolutions of the spring so as to cover the bottom portions thereof. The ends of the bar 106 are mounted in suitable slots provided in the portions of the base at the end of the main open-front slot 70 in which the spring is located. Inasmuch as the bar 106 covers the bottom portions of the spring convolutions, it prevents the said bottom portions from distracting attention from the front portions of the spring and from the graduations thereof.

The instrument shown in Figs. 6 to 10 is provided with means on the base separate from the spring and serving with the spring at various lengths to distinguish certain selected graduations from other graduations. The said separate means for distinguishing certain selected graduations comprises a second spring 108 which is or may be similar to the spring 84 and which is also located in the open-front groove 70 and which is also connected at its ends with the transverse arms 87 and 92. Thus the length of the spring 108 is varied in accordance with variations in the length of the spring 84. The spring 108 is shown in Figs. 6, 7, 8 and 10, but is omitted from Fig. 9 for the sake of clarity of illustration.

As clearly shown in Figs. 7 and 8 the position of the spring 108 is inverted with respect to that of the spring 84 so that straight portions of the convolutions are horizontal and at the top. As already stated, a portion 83 of the base is made of transparent material so that the spring 84 is visible from the top. Alternatively, the entire base may be made of transparent material.

The spacing between the convolutions of the spring 108 is a multiple of the spacing between the convolutions of the spring 84. As shown, the convolution spacing of the spring 108 is twice the convolution spacing of the spring 84. The top front corner of each convolution of the spring 108 is closely adjacent the end of one of the front portions 86 of the spring 84. When viewed from the top the front corners of the convolutions of the spring 108 serve to designate or distinguish every second graduation of the spring 84.

As stated, the front portions of the convolutions of the spring 108 directly serve to designate selected graduations of the spring 84. It is preferable, however, to specially mark certain convolutions of the spring 108 so as to differentially designate or distinguish particular graduations of the spring 84. This marking of the convolutions of the spring 108 may be varied but preferably and as shown certain convolutions of the spring 108 carry separate tabs or pointers 110. These tabs or pointers are placed on all convolutions corresponding to multiples of a predetermined number such as 5. The tabs or pointers 110 are connected by soldering or otherwise with top portions of the corresponding spring convolutions. When the tabs or pointers 110 are placed as described they designate or distinguish every tenth graduation of the spring 84. It will be obvious that the convolutions and pointers of the spring 108 always designate the same graduations on the spring 84, notwithstanding variations in the lengths of the springs.

Notwithstanding the provision of the spring 108 and the pointers 110 thereon, the spring 84 is preferably provided, as already stated, with colored markings on the front portions thereof to distinguish the graduations. In some instances, however, it may be desirable to omit the colored markings on the spring 84 when the spring 108 and its pointers 110 are provided.

The spring 108 may be connected with the transverse arms 87 and 92 as indicated in Fig. 10. With the spring 108 so connected, the front corners of its convolutions and the pointers 110 move in approximate unison with the graduations of the spring 84. There may be minor variations but these are unimportant as the spring 108 is not depended upon for accuracy. Its function is merely to designate selected graduations on the accurate spring 84.

*Instrument shown in Figs. 11 to 14*

The instrument shown in Figs. 11 to 14 is in many respects similar to that shown in Figs. 6 to 10. It differs chiefly in the provision of lazy tong links in lieu of a supplemental spring such as 108 for designating certain selected graduations on the main spring. The base, the slide, the main spring and the scales may be exactly or substantially as already described in connection with Figs. 6 to 10.

The main spring 112 has front corner portions 114 and these front corner portions together with the adjacent inclined portions 116 constitute the graduations. The spring 112 may have markings as already described in connection with the spring 14. The bar 106 shown in Figs. 6 to 10 is omitted and the bottoms of the convolutions of the spring 112 are preferably colored to match the bottom of the base as described in connection with Figs. 1 to 5.

Arms 118 and 120 are provided which are similar respectively to the arms 87 and 92 but which differ as to details of formation. The arm 118 differs from the arm 87 in that it is extended downward and forward at the front so as to be positioned adjacent the inclined portion 116 of the spring 112 at the extreme right end thereof, or at the left end thereof as viewed in Fig. 13. The said end portion 116 is connected by soldering or otherwise with the forward and downward extending portion of the arm 118. Thus the last said portion 116 of the spring 112 is always maintained in a transverse position and is not permitted to flex to an angular position as shown in Fig. 10. This is somewhat less desirable in one respect as the said convolution portion 116 at the end is not kept in parallelism with the other portions 116. However, this alternative construction has the advantage that the scales 122 and 124 which are generally similar to the scales 98 and 100 require no compensating variations in the graduations thereof such as has been described in connection with Figs. 1 to 5.

In lieu of the second spring 108 shown in Figs. 6 to 10 there is provided a series of lazy tong links 126. The links are shown in Figs. 11, 12 and 14, but are omitted from Fig. 13 for the sake of clarity of illustration. The spacing between the pivot points of each two adjacent pairs of links is a multiple of the spacing between the convolutions of the spring 112. As shown, the spacing between the said pivot points is five times the convolution spacing of the spring 112. The lazy tong links are connected at 128 and 130 with the arms 118 and 120, the axes of the said pivots being in transverse register with the graduations "0" and "100" of the spring 112. Thus the effective length of the series of toggle links is the same as the effective length of the spring.

Movable pointers 132 are connected with the lazy tong links and as shown they are connected at each alternate central pivot point 134. A longitudinal wire 136 extends through apertures in the pointers 132 to maintain them in their transverse positions as shown. The front ends of the pointers 132 register with each tenth inclined portion 116 of the spring 112. Thus the pointers 132 serve to designate or distinguish every tenth graduation on the spring 112. It will be obvious that the pointers 132 always designate the same graduations on the spring 112 notwithstanding variations in the length of the spring. The pointer at the extreme right may be carried directly by the arm 118. By reason of the angular movement of the inclined front portions 116 of the spring, the pointers 132 will not always exactly register with the upper rear ends of the said inclined portions. However, the variations are small and the pointers nevertheless serve to designate the selected graduations.

The lazy tong links and the pointers 132 thereon cannot be depended upon for extreme accuracy because of unavoidable variations in the links themselves and unavoidable looseness in the pivotal connections between them. However, the function of the lazy tong links is merely to designate selected graduations on the spring 112 and inaccuracies in the lazy tong links are therefore unimportant.

What I claim is:

1. The combination in an instrument of the class described, of a base, a member movable along the base, and a coil spring which has its convolutions uniformly spaced and which is connected at one end with the said base and at the opposite end with the said member so that the spacings between all of the convolutions are uniformly varied when the spring length is varied by movement of the member along the base, the several convolutions of the spring being triangular in shape to provide aligned sharp corner portions constituting graduations.

2. The combination in an instrument of the class described, of a base, a member movable along the base, a coil spring which has its convolutions uniformly spaced and which is connected at one end with the said base and at the opposite end with the said member so that the spacings between all of the convolutions are uniformly varied when the spring length is varied by movement of the member along the base, the several convolutions of the spring being triangular in shape to provide aligned sharp corner portions constituting graduations, and a plurality of differential markings on the sides of some of the convolutions and extending therealong to the graduations at the said sharp corner portions which markings are spaced in conformity with a predetermined pattern.

3. The combination in an instrument of the class described, of an elongated base having a longitudinal guideway thereon, a slide movable along the guideway, and a longitudinally extending coil spring which has its convolutions uniformly spaced longitudinally and which is connected at one end with the base and at the opposite end with the slide so that the spacings between all of the convolutions are uniformly varied when the spring length is varied by movement of the slide, the several convolutions of the spring being triangular in shape to provide longitudinally aligned sharp corner portions closely adjacent the front edge of the base and constituting graduations.

4. The combination in an instrument of the class described, of an elongated base having a longitudinal guideway thereon and having a thin portion along the front immediately adjacent the bottom plane of the base and having a straight longitudinal edge, a slide movable along the guideway, and a longitudinally extending coil spring which has its convolutions uniformly spaced longitudinally and which is connected at one end with the base and at the opposite end with the slide so that the spacings between all of the convolutions are uniformly varied when the spring length is varied by movement of the slide, the several convolutions of the spring being triangular in shape to provide longitudinally aligned sharp corner portions constituting graduations and the spring being located so that straight portions of the several convolutions are at the bottom and substantially horizontal and are closely adjacent the said thin portion of the base and so that the said graduations are closely adjacent the straight front edge of the said thin portion of the base.

5. The combination in an instrument of the class described, of an elongated base having a longitudinal guideway thereon, a slide movable along the guideway, a longitudinally extending coil spring which has its convolutions uniformly spaced longitudinally and which is connected at one end with the base and at the opposite end with the slide so that the spacings between all of the convolutions are uniformly varied when the spring length is varied by movement of the slide, the several convolutions of the spring being triangular in shape to provide longitudinally aligned sharp corner portions closely adjacent the front edge of the base and constituting graduations, and a plurality of differential markings on the forward upper sides of some of the convolutions and extending therealong downward and forward to the graduations at the said sharp corner portions which markings are spaced in conformity with a predetermined pattern.

6. For use in an instrument of the class described, a coil spring having its convolutions uniformly spaced longitudinally, its several convolutions being triangular in shape to provide longitudinally aligned sharp corner portions constituting graduations, and a plurality of differential markings on the sides of some of the convolutions and extending therealong to the graduations at the said sharp corner portions which markings are spaced in conformity with a predetermined pattern.

7. The combination in an instrument of the class described, of an elongated base having a longitudinal guideway thereon and having a thin portion along the front immediately adjacent the bottom plane of the base and having a straight longitudinal front edge for drafting purposes, a slide movable along the guideway, and a longitudinally extending spring which has its convolutions uniformly spaced longitudinally and which is connected at one end with the base and at the opposite end with the slide so that the spacings between all of the convolutions are uniformly varied when the spring length is varied by movement of the slide, the several convolutions of the spring being shaped to provide longitudinally aligned sharp corner portions constituting graduations at the front and the spring being located so that the said graduations are immediately adjacent but spaced rearward from the straight front edge of the said thin portion of the base and so that the upper front portions of the convolutions are inclined upward and rearward from the said graduations.

8. The combination in an instrument of the class described, of an elongated base having a longitudinal guideway thereon and having a thin portion along the front immediately adjacent the bottom plane of the base and having a straight longitudinal front edge for drafting purposes, a slide movable along the guideway, and a longitudinally extending spring which has its convolutions uniformly spaced longitudinally and which is connected at one end with the base and at the opposite end with the slide so that the spacings between all of the convolutions are uniformly varied when the spring length is varied by movement of the slide, the several convolutions of the spring being shaped to provide longitudinally aligned sharp corner portions constituting graduations at the front and the spring being located so that the said graduations are immediately adjacent but spaced rearward from the straight front edge of the said thin portion of the base, and means associated with the spring and serving with the spring at various lengths to distinguish certain selected graduations from other graduations.

9. The combination in an instrument of the class described, of an elongated base having a longitudinal guideway thereon, a slide movable along the guideway, a longitudinally extending coil spring having convolutions which are uniformly spaced longitudinally and which are shaped to provide longitudinally aligned graduation portions, the said spring being located with respect to the base and the slide so that the said graduation portions are closely adjacent the front edge of the base and closely adjacent the bottom plane of the base, and means for connecting the ends of the spring to the base and slide respectively so that the spacings between all of the graduations are uniformly varied when the spring length is varied by movement of the slide, the said connecting means at the base engaging the spring to prevent longitudinal movement of the immediately adjacent graduation.

10. The combination in an instrument of the class described, of an elongated base having a longitudinal guideway thereon, a slide movable along the guideway, a longitudinally extending coil spring having convolutions which are uniformly spaced longitudinally and which are shaped to provide longitudinally aligned graduation portions, the said spring being located with respect to the base and the slide so that the said graduation portions are closely adjacent the front edge of the base and closely adjacent the bottom plane of the base, means for connecting the ends of the spring to the base and slide respectively so that the spacings between all of the graduations are uniformly varied when the spring length is varied by movement of the slide, the said connecting means at the base engaging the spring to prevent longitudinal movement of the immediately adjacent graduation, and a longitudinal scale in fixed position on the base and in fixed relation to the last said graduation for indicating the amount of slide movement and for thus indicating the corresponding variation of spring length.

11. The combination in an instrument of the class described, of an elongated base having a longitudinal guideway thereon, a slide movable along the guideway, a longitudinally extending coil tension spring having convolutions which are uniformly spaced longitudinally and which are shaped to provide longitudinally aligned graduation portions, means for connecting the ends of the spring to the base and slide respectively so that the spacings between all of the graduations are uniformly varied when the spring length is varied by movement of the slide, the said connecting means at the base rigidly engaging the spring to prevent longitudinal movement of the immediately adjacent graduation, and means for stiffening the wire of the spring convolution at the end which is connected with the base.

12. The combination in an instrument of the class described, of an elongated base having a longitudinal guideway thereon, a slide movable along the guideway, a longitudinally extending coil spring having convolutions which are uniformly spaced longitudinally and which are shaped to provide longitudinally aligned graduations, means for connecting the ends of the spring to the base and slide respectively so that the spacings between all of the graduations are uniformly varied when the spring length is varied by movement of the slide, the said connecting means at least at one end engaging the spring otherwise than at the graduation thereof at the said end, and a longitudinal scale for indicating the amount of slide movement and for thus indicating the corresponding variation of spring length, the scale being graduated to compensate for the variations in the spacing of the graduations of the spring arising from its engagement with the connecting means otherwise than at a graduation.

13. The combination in an instrument of the class described, of an elongated base having a longitudinal guideway thereon, a slide movable along the guideway, a longitudinally exteding coil spring having convolutions which are uniformly spaced longitudinally and which are triangular in shape so as to provide longitudinally aligned sharp corner portions constituting graduations at the bottom of the spring, and means for connecting the ends of the spring to the base and slide respectively so that the spacings between all of the graduations are uniformly varied when the spring length is varied by movement of the slide, the said connecting means at the base engaging the spring immediately adjacent the graduation thereof at the said end so that the upper front portion of the spring extending from the last said graduation is free to flex and the said connecting means at the slide engaging the spring at a point remote from the graduation at the last said end so that the portion of the spring extending from the last said graduation is free to flex.

14. The combination in an instrument of the class described, of an elongated base having a longitudinal guideway thereon, a slide movable along the guideway, a longitudinally extending coil spring having convolutions which are uniformly spaced longitudinally and which are triangular in shape so as to provide longitudinally aligned sharp corner portions constituting graduations at the bottom of the spring, means for connecting the ends of the spring to the base and slide respectively so that the spacings between all of the graduations are uniformly varied when the spring length is varied by movement of the slide, the said connecting means at the base engaging the spring immediately adjacent the graduation thereof at the said end so that the upper front portion of the spring extending from the last said graduation is free to flex and the said connecting means at the slide engaging the spring at a point remote from the graduation at the last said end so that the portion of the spring extending from the last said graduation is free to flex, and a longitudinal scale on the base for indicating the amount of slide movement and for thus indicating the corresponding variation of spring length, the scale being graduated to compensate for the variations in the spacing of the graduations of the spring arising from its connection with the slide at a point remote from the graduation at the corresponding end.

15. The combination in an instrument of the class described, of an elongated base having a longitudinal guideway thereon, a slide movable along the guideway, a longitudinally extending coil spring having convolutions which are uniformly spaced longitudinally and which are shaped to provide longitudinally aligned graduations adjacent the base, and means for connecting the ends of the spring to the base and slide respectively so that the spacings between all of the graduations are uniformly varied when the spring length is varied by movement of the slide, the said connecting means engaging the spring to prevent movement relatively to the base and the slide of the graduations at the respective ends of the spring.

16. The combination in an instrument of the class described, of an elongated base having a longitudinal guideway thereon, a slide movable along the guideway, a longitudinally extending coil spring having convolutions which are uniformly spaced longitudinally and which are triangular in shape with straight portions of substantially equal length so as to provide aligned sharp corner portions constituting graduations at the bottom of the spring and adjacent the front of the base, and means for connecting the ends of the spring to the base and slide respectively so that the spacings between all of the graduations are uniformly varied when the spring length is varied by movement of the slide, the said connecting means engaging the spring to prevent movement relatively to the base and the slide of the graduations at the respective ends of the spring.

17. The combination in an instrument of the class described, of an elongated base having a longitudinal guideway thereon, a slide movable along the guideway, a longitudinally extending coil spring which has its convolutions uniformly spaced longitudinally and which is connected at one end with the base and at the opposite end with the slide so that the spacings between all of the convolutions are uniformly varied when the spring length is varied by movement of the slide, the several convolutions of the spring being shaped to provide longitudinally aligned transversely narrow portions constituting graduations and the spring being located so that the bottom of the spring is above and closely adjacent a portion of the base, a plurality of differential colored markings on the fronts of some of the spring convolutions and extending therealong to the graduations at the said tranversely narrow portions, and uniform coloring on the bottom portions of all of the spring convolutions contrasting with the said differential colored markings on the front portions and matching the color of the portion of the base below the spring.

18. The combination in an instrument of the class described, of an elongated base having a longitudinal guideway thereon, a slide movable along the guideway, a longitudinally extending coil spring which has its convolutions uniformly spaced longitudinally and which is connected at one end with the base and at the opposite end with the slide so that the spacings between all of the convolutions are uniformly varied when the spring length is varied by movement of the slide, the several convolutions of the spring being shaped to provide longitudinally aligned transversely narrow portions constituting graduations and the spring being located so that the bottom of the spring is above and closely adjacent a portion of the base, colored markings on the fronts of all of the spring convolutions and extending therealong to the graduations at the said transversely narrow portions, and uniform coloring on all of the bottom portions of the spring convolutions contrasting with the first said colored markings on the front portions and matching the color of the portion of the base below the spring.

19. The combination in an instrument of the class described, of an elongated base having a longitudinal guideway thereon, a slide movable along the guideway, a longitudinally extending coil spring which has its convolutions uniformly spaced longitudinally and which is connected at one end with the base and at the opposite end with the slide so that the spacings between all of the convolutions are uniformly varied when the spring length is varied by movement of the slide, the several convolutions of the spring being triangular in shape to provide longitudinally aligned sharp corner portions constituting graduations and the spring being located so that straight portions of the several convolutions are at the bottom and substantially horizontal and above and closely adjacent a portion of the base, colored markings on the forward front portions of all of the spring convolutions and extending therealong to the graduations at the said sharp corner portions, and uniform coloring on all of the straight bottom portions of the spring convolutions contrasting with the first said colored markings and matching the color of the portion of the base below the spring.

20. The combination in an instrument of the class described, of an elongated base having a longitudinal guideway thereon, a slide movable along the guideway, a longitudinally extending coil spring which has its convolutions uniformly spaced longitudinally and which is connected at one end with the base and at the opposite end with the slide so that the spacings between all of the convolutions are uniformly varied when the spring length is varied by movement of the slide, the several convolutions of the spring being triangular in shape to provide longitudinally aligned sharp corner portions constituting graduations and the spring being located so that straight portions of the several convolutions are at the bottom and substantially horizontal and above and closely adjacent a portion of the base, colored markings on the forward front portions of all of the spring convolutions and extending therealong to the graduations at the said sharp corner portions, some of the said markings having different colors and being spaced in accordance with a predetermined pattern, and uniform coloring on all of the straight bottom portions of the spring convolutions contrasting with the first said colored markings and matching the color of the portion of the base below the spring.

21. For use in an instrument of the class described, a coil spring having its convolutions uniformly spaced longitudinally, its several convolutions being spaced to provide longitudinally aligned transversely narrow portions constituting graduations, colored markings on all of the spring convolutions at one side thereof and extending therealong to the said graduations, and uniform coloring on the opposite side of the said convolutions and adjacent the graduations with the last said coloring contrasting with the first said colored markings.

22. For use in an instrument of the class described, a coil spring having its convolutions uniformly spaced longitudinally, its several convolutions being triangular in shape to provide longitudinally aligned sharp corner portions constituting graduations, colored markings on all of the spring convolutions at one side thereof and extending therealong to the graduations at the said sharp corner portions, some of the said markings having different colors and being spaced in accordance with a predetermined pattern, and uniform coloring on all of the spring convolutions at another side thereof adjacent the said graduations with the last said coloring contrasting with the first said colored markings.

23. In an instrument of the class described, the combination of a base having a longitudinal guideway thereon, a slide movable along the guideway, a longitudinally extending coil spring which has its convolutions longitudinally spaced in conformity with a predetermined pattern and which is connected at one end with the base and at the opposite end with the slide so that the spacings between all of the convolutions are varied when the total spring length is varied by movement of the slide, the several convolutions of the spring having similar transversely narrow portions constituting graduations and the said spring being located with respect to the base and the slide so that the said graduation portions are closely adjacent the front edge of the base and closely adjacent the bottom plane of the base and so that the upper front portions of the convolutions are inclined upward and rearward from the front sides of the said narrow graduation portions, a plurality of differential colored markings on the fronts of some of the spring convolutions and extending therealong to the graduations which markings are spaced in conformity with a predetermined pattern, and a longitudinal bar positioned within the convolutions of the spring adjacent the bottom portions of the convolutions and serving to cover substantially the entire bottom portions of the convolutions.

24. The combination in an instrument of the class described, of an elongated base having a longitudinal guideway thereon, a slide movable along the guideway, a longitudinally extending coil spring which has its convolutions uniformly spaced longitudinally and which is connected at one end with the base and at the opposite end with the slide so that the spacings between all of the convolutions are uniformly varied when the spring length is varied by movement of the slide, the several convolutions of the spring being triangular in shape to provide longitudinally aligned sharp corner portions constituting graduations and the spring being located so that straight portions of the several convolutions are at the bottom and substantially horizontal and closely adjacent a portion of the base, a plurality of differential colored markings on the fronts of some of the spring convolutions and extending therealong to the graduations which markings are spaced in conformity with a predetermined pattern, and a longitudinal bar positioned within the convolutions of the spring adjacent the horizontal portions of the convolutions and serving to cover substantially the entire bottom portions of the convolutions.

25. The combination in an instrument of the class described, of an elongated base having a longitudinal guideway thereon, a slide movable along the guideway, a longitudinally extending coil spring which has its convolutions uniformly spaced longitudinally and which is connected at one end with the base and at the opposite end with the slide so that the spacings between all of the convolutions are uniformly varied when the spring length is varied by movement of the slide, the several convolutions of the spring being triangular in shape to provide longitudinally aligned sharp corner portions constituting graduations and the spring being located so that straight portions of the several convolutions are at the bottom and substantially horizontal and closely adjacent a portion of the base, colored markings on the fronts of all of the spring convolutions and extending therealong to the graduations at the sharp corner portions, and a longitudinal bar positioned within the convolutions of the spring adjacent the horizontal portions of the convolutions and serving to cover substantially the entire bottom portions of the convolutions.

26. An instrument of the class described comprising an elongated base having an open-top longitudinal groove and an open-front longitudinal groove, a slide longitudinally movable in the open-top groove, a forward extending arm on the slide, and a longitudinally extending spring in the open-front groove which has its convolutions uniformly spaced longitudinally and which is connected at one end with the base and at the opposite end with the arm on the slide so that the spacings between all of the convolutions are uniformly varied when the spring length is varied by movement of the slide, the several convolutions of the spring having transversely narrow portions constituting graduations which are located closely adjacent the front of the open-front groove.

27. An instrument of the class described comprising an elongated base having an open-top longitudinal groove and an open-front longitudinal groove, a slide longitudinally movable in the open-top groove and having a longitudinal hole therethrough, the said slide having a transverse groove in one end registering with the hole, a wire extending through the hole in the slide and bent to provide an arm located in the groove in the slide and extending forward, and a longitudinally extending spring in the open-front groove which has its convolutions uniformly spaced longitudinally and which is connected at one end with the base and at the opposite end with the arm on the slide so that the spacings between all of the convolutions are uniformly varied when the spring length is varied by movement of the slide, the several convolutions of the spring having transversely narrow portions constituting graduations which are located closely adjacent the front of the open-front groove.

28. An instrument of the class described comprising an elongated base having an open-top longitudinal groove and an open-front longitudinal groove with a longitudinal slot between the two grooves, a slide longitudinally movable in the open-top groove, an arm on the slide extending forward through the slot, and a longitudinally extending spring in the open-front groove which has its convolutions uniformly spaced longitudinally and which is connected at one end with the base and at the opposite end with the arm on the slide so that the spacings between all of the convolutions are uniformly varied when the spring length is varied by movement of the slide, the several convolutions of the spring having transversely narrow portions constituting graduations which are located closely adjacent the front of the open-front groove.

29. An instrument of the class described comprising an elongated base having an open-top longitudinal groove and an open-front longitudinal groove with a longitudinal slot between the two grooves, a stationary block in the open-top groove at one end thereof, an arm on the block extending forward through the slot, a slide longitudinally movable in the open-top groove, an arm on the slide extending forward through the slot, and a longitudinally extending spring in the open-front groove which has its convolutions uniformly spaced longitudinally and which is connected at one end with the arm on the block and at the opposite end with the arm on the slide so that the spacings between all of the convolutions are uniformly varied when the spring length is changed by movement of the slide, the several convolutions of the spring having transversely narrow portions constituting graduations which are located closely adjacent the front of the open-front groove.

30. An instrument of the class described comprising an elongated base having an open-top longitudinal groove and an open-front longitudinal groove with a longitudinal slot between the two grooves, a slide longitudinally movable in the open-top groove and having a longitudinal hole therethrough, the said slide having a transverse groove in one end registering with the hole, a wire extending through the hole in the slide and bent to provide an arm located in the groove in the slide and extending through the slot in the base, and a longitudinally extending spring in the open-front groove which has its convolutions uniformly spaced longitudinally and which is connected at one end with the base and at the opposite end with the arm on the slide so that the spacings between all of the convolutions are uniformly varied when the spring length is changed by movement of the slide, the several convolutions of the spring having transversely narrow portions constituting graduations which are located closely adjacent the front of the open-front groove.

31. An instrument of the class described comprising an elongated base having an open-top longitudinal groove and an open-front longitudinal groove with a longitudinal slot between the two grooves, a slide longitudinally movable in the open-top groove, an arm on the slide extending forward through the slot, a longitudinally extending spring in the open-front groove which has its convolutions uniformly spaced longitudinally and which is connected at one end with the base and at the opposite end with the arm on the slide so that the spacings between all of the convolutions are uniformly varied when the spring length is varied by movement of the slide, the several convolutions of the spring having transversely narrow portions constituting graduations which are located closely adjacent the front of the open-front groove, and a longitudinal scale on the top of the base at one side of the open-top groove for indicating the amount of slide movement and for thus indicating the corresponding variation in spring length.

32. An instrument of the class described comprising an elongated base having an open-top longitudinal groove and an open-front longitudinal groove having the front edge of its upper wall spaced rearward from the front edge of its lower wall, the said base also having a longitudinal slot between the two grooves, a slide longitudinally movable in the open-top groove, an arm on the slide extending forward through the slot, and a longitudinally extending spring in the open-front groove which has its convolutions uniformly spaced longitudinally and which is connected at one end with the base and at the opposite end with the arm on the slide so that the spacings between all of the convolutions are uniformly varied when the spring length is varied by movement of the slide, the several convolutions of the spring being triangular in shape to provide three sets of longitudinally aligned corner portions with the corner portions of one set sharp and constituting graduations and the spring being located in the open-front groove so that the graduations are immediately adjacent the front edge of the lower wall of the said groove and so that the corner portions of another set are closely adjacent the front edge of the upper wall of the said groove.

33. The combination in an instrument of the class described, of a base having a longitudinal guideway thereon, a slide movable along the guideway, a longitudinally extending spring which has its convolutions uniformly spaced longitudinally and shaped to provide longitudinally aligned graduations at the front, the said spring being connected at one end with the base and at the opposite end with the slide so that the spacings between all of the graduations are varied when the total spring length is varied by movement of the slide, and movable means on the base immediately adjacent but separate from the spring and serving with the spring at various lengths to distinguish certain selected graduations from other graduations.

34. The combination in an instrument of the class described, of a base having a longitudinal guideway thereon, a slide movable along the guideway, a longitudinally extending spring which has its convolutions uniformly spaced longitudinally and shaped to provide longitudinally aligned graduations at the front, the said spring being connected at one end with the base and at the opposite end with the slide so that the spacings between all of the graduations are varied when the total spring length is varied by movement of the slide, and movable pointers supported by the base and separate from the spring and serving with the spring at various lengths to distinguish certain selected graduations from other graduations.

35. The combination in an instrument of the class described, of a base having a longitudinal guideway thereon, a slide movable along the guideway, a longitudinally extending spring which has its convolutions longitudinally spaced in accordance with a predetermined pattern and shaped to provide longitudinally aligned graduations at the front, the said spring being connected at one end with the base and at the opposite end with the slide so that the spacings between all of the graduations are varied when the total spring length is varied by movement of the slide, and pointers carried directly by the base and manually movable longitudinally thereof and serving with the spring at various lengths to indicate certain selected graduations and distinguish them from other graduations.

36. In an instrument of the class described, the combination of a base having a longitudinal guideway thereon, a slide movable along the guideway, a longitudinally extending coil spring which has its convolutions longitudinally spaced in conformity with a predetermined pattern and which is connected at one end with the base and at the opposite end with the slide so that the spacings between all of the convolutions are varied when the total spring length is varied by movement of the slide, the several convolutions of the spring having similar transversely narrow portions constituting graduations and the said spring being located with respect to the base and the slide so that the said graduation portions are closely adjacent the front edge of the base and closely adjacent the bottom plane of the base and so that the upper front portions of the convolutions are inclined upward and rearward from the front sides of the said narrow graduation portions, and a pointer adjustable along the base independently of the slide in a path closely adjacent the bottom plane of the base and positionable in register with the graduation portion of any convolution.

37. The combination in an instrument of the class described, of a base having a longitudinal guideway thereon, a slide movable along the guideway, a longitudinally extending spring which has its convolutions uniformly spaced longitudinally and shaped to provide longitudinally aligned graduations at the front, the said spring being connected at one end with the base and at the opposite end with the slide so that the spacings between all of the graduations are varied when the total spring length is varied by movement of the slide, and means on the base immediately adjacent but separate from the spring and serving with the spring at various lengths to distinguish certain selected graduations from other graduations, the said means being connected with the base and the slide and being automatically movable when the slide is moved to vary the length of the spring.

38. The combination of a longitudinally extending coil spring variable in length from end to end thereof upon the application of longitudinal force thereto and having convolutions uniformly spaced longitudinally, portions of the sail convolutions constituting graduations, a second longitudinally extending spring which is immediately adjacent the first said spring and which is variable in length from end to end thereof upon the application of longitudinal force thereto and having convolutions uniformly spaced longitudinally, the spacings between the several spacings of the convolutions of the second spring being multiples of the several spacings between the convolutions of the first spring so that the said convolutions of the second spring register with selected convolutions of the first spring to distinguish selected graduations, and means for varying the total lengths of both springs to the same extent.

39. The combination in an instrument of the class described, of a base having a longitudinal guideway thereon, a slide movable along the guideway, a longitudinally extending spring which has its convolutions uniformly spaced longitudinally and shaped to provide longitudinally aligned graduations, the said spring being connected at one end with the base and at the opposite end with the slide so that the spacings between all of the graduations are varied when the total spring length is varied by movement of the slide, and a second longitudinally extending spring adjacent the first spring and having its convolutions uniformly spaced longitudinally, the said second spring being also connected at one end with the base and at the opposite end with the slide so that the spacings between all of the convolutions are varied when the total springs length is varied by movement of the slide and the said second spring having some of its convolutions registering with selected convolutions of the first spring to distinguish selected graduations.

40. The combination in an instrument of the class described, of a base having a longitudinal guideway thereon, a slide movable along the guideway, a longitudinally extending spring which has its convolutions uniformly spaced longitudinally and shaped to provide longitudinally aligned graduations, the said spring being connected at one end with the base and at the opposite end with the slide so that the spacings between all of the graduations are varied when the total spring length is varied by movement of the slide, and a second longitudinally extending spring adjacent the first spring and having its convolutions uniformly spaced longitudinally, the said second spring being also connected at one end with the base and at the opposite end with the slide so that the spacings between all of the convolutions are varied when the total spring length is varied by movement of the slide and the said second spring having the several spacings between its convolutions multiples of the several spacings between the convolutions of the first spring so that the said convolutions of the second spring register with selected convolutions of the first spring to distinguish selected graduations.

41. The combination in an instrument of the class described, of a base having a longitudinal guideway thereon, a slide movable along the guideway, a longitudinally extending spring which has its convolutions uniformly spaced longitudinally and shaped to provide longitudinally aligned graduations, the said spring being connected at one end with the base and at the opposite end with the slide so that the spacings between all of the graduations are varied when the total spring length is varied by movement of the slide, a second longitudinally extending spring adjacent the first spring and having its convolutions uniformly spaced longitudinally, the said second spring being also connected at one end with the base and at the opposite end with the slide so that the spacings between all of the convolutions are varied when the total spring length is varied by movement of the slide and the said second spring having the several spacings between its convolutions multiples of the several spacings between the convolutions of the first spring so that the said convolutions of the second spring register with selected convolutions of the first spring to distinguish selected graduations, and a plurality of uniformly spaced means on some of the convolutions of the second spring with the several spacings between them multiples of the several spacing between the convolutions of the said second spring which means serve to distinguish additionally selected graduations.

42. An instrument of the class described comprising an elongated base having a longitudinal guideway and an open-front longitudinal groove, the portion of the base above the groove being transparent, a slide longitudinally movable along the guideway, a longitudinally extending spring in the open-front groove which has its convolutions uniformly spaced longitudinally and which is connected at one end with the base and at the opposite end with the slide so that the spacings between all of the convolutions are uniformly varied when the spring length is varied by movement of the slide, the several convolutions of the spring having transversely narrow portions constituting graduations which are located closely adjacent the front of the open-front groove, and a second longitudinally extending spring in the open-front groove behind and adjacent the first spring and having its convolutions uniformly spaced longitudinally, the said second spring being visible through the said transparent portion of the base and being also connected at one end with the base and at the opposite end with the slide so that the spacings between all of the convolutions are varied when the total spring length is varied by movement of the slide and the said second spring having the several spacings between its convolutions of multiples of the several spacings between the convolutions of the first spring so that the said convolutions of the second spring register with selected convolutions of the first spring to distinguish selected graduations.

43. The combination in an instrument of the class described, of a base having a longitudinal guideway thereon, a slide movable along the guideway, a longitudinally extending spring which has its convolutions uniformly spaced longitudinally and shaped to provide longitudinally aligned graduations, the said spring being connected at one end with the base and at the opposite end with the slide so that the spacings between all of the graduations are varied when the total spring length is varied by movement of the slide, and a longitudinally extending series of lazy tong links adjacent the spring and connected at one end with the base and at the opposite end with the slide so that the longitudinal spacings between the links of the said series are varied when the total spring length is varied by movement of the slide, said series of lazy tong links having means registering with selected convolutions of the spring to distinguish selected graduations.

44. The combination in an instrument of the class described, of a base having a longitudinal guideway thereon, a slide movable along the guideway, a longitudinally extending spring which has its convolutions uniformly spaced longitudinally and shaped to provide longitudinally aligned graduations, the said spring being connected at one end with the base and at the opposite end with the slide so that the spacings between all of the graduations are varied when the total spring length is varied by movement of the slide, a longitudinally extending series of lazy tong links adjacent the spring and connected at one end with the base and at the opposite end with the slide so that the longitudinal spacings between the links of the said series are varied when the total spring length is varied by movement of the slide, the said series of lazy tong links having the several spacings between its links multiples of the spacings between spring convolutions, and longitudinally spaced pointers carried by the lazy tong links and registering with selected convolutions of the spring to distinguish selected graduations.

HEINZ JOSEPH GERBER.

REFERENCES CITED

The following references are of record in the file of this patent:

UNITED STATES PATENTS

| Number | Name | Date |
|---|---|---|
| 2,331,298 | Bennett | Oct. 12, 1943 |
| 2,422,745 | Ost | June 24, 1947 |